United States Patent [19]

Schonlau et al.

[11] Patent Number: 5,305,606
[45] Date of Patent: Apr. 26, 1994

[54] ACTUATING UNIT FOR HYDRAULIC BRAKE SYSTEMS

[75] Inventors: Juergen Schonlau, Walluf; Holger von Hayn, Bad Vilbel, both of Fed. Rep. of Germany

[73] Assignee: Alfred Teves GmbH, Fed. Rep. of Germany

[21] Appl. No.: 926,246

[22] Filed: Aug. 6, 1992

[30] Foreign Application Priority Data

Aug. 16, 1991 [DE] Fed. Rep. of Germany ....... 4127001

[51] Int. Cl.$^5$ ............................................. B60T 13/00
[52] U.S. Cl. .................... 60/547.1; 91/369.4; 91/533
[58] Field of Search ............ 60/547.1, 547.2, 550, 60/553, 547.3; 91/369.4, 533

[56] References Cited

U.S. PATENT DOCUMENTS

| | | |
|---|---|---|
| 1,660,176 | 2/1928 | Rayburn . |
| 3,719,044 | 3/1973 | Bach .................................. 60/547 B |
| 3,855,797 | 12/1974 | Papiav ................................. 60/547.1 |
| 4,718,327 | 1/1988 | Myers ................................. 91/369.4 |
| 5,161,451 | 11/1992 | Fecher .............................. 91/369.4 |

FOREIGN PATENT DOCUMENTS

| | | |
|---|---|---|
| 710643 | 9/1941 | Fed. Rep. of Germany . |
| 1943694 | 4/1966 | Fed. Rep. of Germany . |
| 2024592 | 5/1969 | Fed. Rep. of Germany . |
| 7300934.4 | 1/1973 | Fed. Rep. of Germany . |
| 254122 | 12/1948 | Switzerland ..................... 60/547.1 |
| 389552 | 3/1933 | United Kingdom . |
| 1155283 | 6/1969 | United Kingdom . |

*Primary Examiner*—Thomas E. Denion
*Attorney, Agent, or Firm*—Dykema Gossett

[57] ABSTRACT

The present invention discloses an actuating unit that achieves shortening of the actuating travel of the brake power booster when the brake system is precharged. The actuating unit is preferably used with hydraulic brake systems of automotive vehicles having a master brake cylinder and a pneumatic brake power booster connected upstream thereof. The master brake cylinder is integrated in the booster housing of the brake power booster and a control valve of the brake power booster is arranged laterally beside the master brake cylinder. The control valve operates opposite to the actuating direction of the actuating member actuating the brake power booster by means of a lever mechanism with variable transmission. The lever mechanism is adapted to be deactivated in terms of effect after a predefinable actuating stroke of the master brake cylinder.

30 Claims, 2 Drawing Sheets

ACTUATING UNIT FOR HYDRAULIC BRAKE SYSTEMS

The present invention relates to an actuating unit for hydraulic brake systems and in particular hydraulic brake systems for automotive vehicles. The hydraulic brake system for the present invention preferably has a dual-circuit master brake cylinder and a pneumatic brake power booster connected upstream thereof in terms of effect. The booster's control valve is actuated by means of an actuating member which is mounted in a control housing laterally beside the master cylinder. The brake booster includes at least one movable wall which is arranged on the control housing, and is adapted to be acted upon by a pneumatic differential pressure and subdivides a booster housing into at least one vacuum chamber and at least one working chamber which can be vented by actuation of the control valve, with the air required for the ventilation of the working chamber being delivered to the control valve preferably out of the engine compartment of the automotive vehicle.

A like actuating unit has become known already from German published patent application 39 08 805. In the vacuum brake power booster shown therein the actuating force is transmitted onto the valve piston actuating the control piston by means of an angular lever coupled to the actuating member and displacing the valve piston which carries a valve seat of the control valve in the direction of movement of the actuating member (a piston rod coupled to a brake pedal). The arrangement of the mentioned component parts is chosen such that the actuating travel of the control valve corresponds to that of the actuating member so that in the event of the brake system being precharged (applying of brake shoes and supplying of a low braking pressure, respectively) a large pedal travel or actuating travel of the actuating member is required. What is also regarded as less favourable is the large lever arm of the angular lever displacing the valve piston, which arm causes tilting torques so that considerable friction is entailed when it is guided in the control housing. Finally, the complicated sealing of the actuating mechanism of the control valve must be considered disadvantageous as well.

BRIEF SUMMARY OF THE INVENTION

Therefore, it is an object of the present invention to provide an actuating unit of the kind initially referred to which has a shorter actuating travel when the brake system is precharged. Further, the friction caused on actuation is desired to be minimized and sealing of the actuating mechanism is to be simplified.

This object is achieved by the present invention in that the control valve is operable opposite to the actuating direction of the actuating member by means of a lever mechanism with variable transmission which is adapted to be deactivated in terms of effect after a predefinable actuating stroke of the master brake cylinder.

To substantiate the idea of the present invention, an advantageous improvement of the invention provides that the lever mechanism is formed of a first lever (reversing lever) which is in force-transmitting connection with the actuating member and cooperates with the valve piston of the control valve and a second lever (transmission lever) which is supported on the control housing to be rotatable within limits and cooperates with an abutment surface arranged on the booster housing. The first (reversing) lever is supported on the second (transmission) lever and is rotatable within limits, and the distance between the point of rotation of the second (transmission) lever and its point of application on the abutment surface is varied during actuation.

Preferably, the abutment of the second (transmission) lever on the abutment surface takes place under the effect of a spring supported on the control housing. The spring may be designed as a leg spring, for instance.

In order to be able to deactivate the previously mentioned transmission mechanism after a stroke of the unit, the rotary motion of the second (transmission) lever is confined by a stop formed fast with the control housing.

A particularly favourable efficiency is obtained in another favourable embodiment of the inventive actuating unit in that the brake power booster is configured as a vacuum brake power booster in tandem design, the pneumatic chambers of which are isolated from each other by a partition wall on which the abutment surface is formed.

Another advantageous improvement of the subject matter of this invention provides that the actuation of the control valve is performed by means of an actuating rod sealedly guided in the control housing and axially abutting on the first (reversing) lever, on the one hand, and being coupled to the actuating member (piston rod) which cooperates with a first (primary) piston of the master brake cylinder, on the other hand. The coupling of the actuating rod to the piston rod is effected by means of a force-transmitting element which embraces the piston rod like a fork and is axially supported thereon. Owing to these measures, a particularly simple force-transmitting connection is realized between the actuating member and the first (reversing) lever which does not necessitate any special sealing apart from a simple ring seal sealing the actuating rod.

Another embodiment of the inventive actuating unit provides that the master brake cylinder is designed as a tandem master cylinder which is integrated in the booster housing and on the housing of which the control housing with the movable wall of the brake power booster is guided. The control housing is furnished with axial guide webs in its guiding area. Proper guidance of the movable wall is achieved by this measure which contributes to enhancing the reliability in operation of the inventive actuating unit.

In another embodiment of this invention, the master brake cylinder is provided at its end with a radial annular flange which abuts axially on the booster housing part remote from the actuating member and which serves to support a resetting spring biassing the movable wall of the brake power booster in opposition to the actuating direction. This measure permits an effective compensation (absorption) of tilting torques caused on actuation and taking effect on the assembly unit—composed of movable walls and control housing.

Another important feature of the invention is that the control valve is arranged in a valve chamber which can be vented and which is designed in the control housing and is sealed in relation to a first vacuum chamber formed in the first pneumatic chamber by means of a diaphragm wall cooperating with the valve piston. It is ensured thereby that the valve piston in the release position is reset to assume its initial position by the pneumatic difference in pressure acting upon the diaphragm wall.

In order to permit in a brake system equipped with the inventive actuating unit that traction slip control operations are performed, a favourable improvement upon the subject matter of the invention provides that the control valve is operable irrespective of the actuating member, preferably by means of an adjusting member cooperating with the valve piston, e.g. a solenoid. This idea seems expedient also in connection with planned traffic safety systems.

In another favourable embodiment of this invention the first (primary) piston of the master brake cylinder is of bipartite design and is composed of an external or annular piston being in force-transmitting connection with the control housing, and of an internal piston being in force-transmitting connection with the actuating member (piston rod). A hydraulic transmission device is realized thereby which, in addition, permits a reaction force to be transmitted resulting from the hydraulic pressure prevailing in the first master cylinder pressure chamber onto the actuating member and, respectively, an actuating member coupled thereto, preferably a brake pedal.

In order that transmission of the actuating force onto the control housing is safeguarded in the event of vacuum failure, it is provided according to the present invention that the internal piston is movable into engagement with an abutment surface designed in the external or annular piston, there being provision of a force-transmitting sleeve on the end of the external or annular piston which is movable into engagement with the control housing. Preferably, said force-transmitting sleeve forms a stop for the internal piston.

Further details, features and advantages of the present invention can be taken from the Claims as well as from the following description of an embodiment with reference to the accompanying drawings.

DETAILED DESCRIPTION OF THE INVENTION

Figure 1:
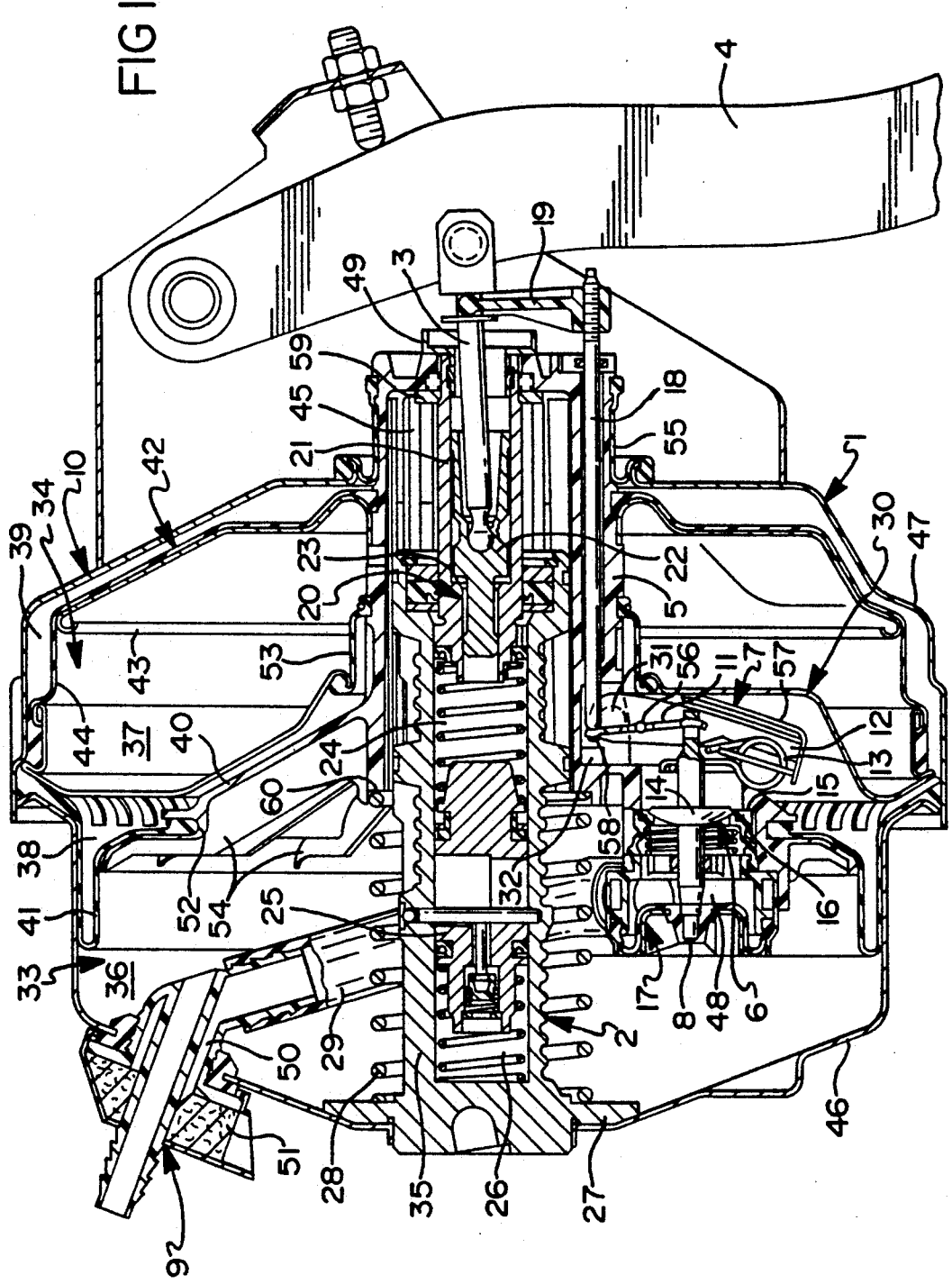
FIG. 1 is an inventive actuating unit in axial cross-section.

The actuating unit shown in the drawing is composed of a vacuum brake power booster 1 which is actuatable by a brake pedal 4 through an actuating member or a piston rod 3, respectively, as well as of a master brake cylinder, preferably a tandem master brake cylinder 2, which in terms of effect is connected downstream of the vacuum brake power booster 1 and which is in communication with a pressure fluid supply reservoir not shown. The vacuum brake power booster 1 comprises two shell-type housing parts 46, 47 assembled with their open sides and forming a booster housing 10. The housing part 46 on the left in FIG. 1 and furnished with a pneumatic port 9 is rigidly connected to the housing 35 of the tandem master brake cylinder 2 which is integrated in the booster housing 10 and is furnished at its end with a radial annular flange 27 by which it takes support on the booster housing part 46. The surface of the master cylinder housing 35 preferably serves to guide a control housing 5, in the interior of which guide webs 45 are provided. The control housing 5 incorporates a pneumatic valve chamber 48 in which a control valve 6 is arranged in parallel to the master brake cylinder 2.

As can be taken easily from the drawing, the illustrated vacuum brake power booster 1 is a brake power booster in tandem design, the housing 10 of which is subdivided by a partition wall 30 into two pneumatic chambers 33 and 34. The pneumatic chamber 33 shown on the left in the drawing is subdivided by a first movable wall 40 arranged therein and preferably designed integrally with the control housing 5 into a first vacuum chamber 36 and a first working chamber 38, while in the pneumatic chamber 34 shown on the right a second movable wall designated by reference numeral 42 confines a second vacuum chamber 37 communicating with the first vacuum chamber 36 and confining a second working chamber 39 which is in communication with the first working chamber 38 that is ventilatable by the control valve 6 during braking. The first movable wall 40 furnished with radially extending reinforcement ribs 54 is sealed in relation to the booster housing 10 by means of a first rolling diaphragm 41, the radially inwardly disposed area of which is received by an annular groove 52 designed in the radially outwardly disposed fringe area of the first movable wall 40. The second movable wall 42 is formed by a metallic diaphragm plate 43 and by a second rolling diaphragm 44 abutting thereon and ensuring its sealing relative to the booster housing 10. Finally, a third rolling diaphragm 53 serves to provide sealing between the control housing 5 and the partition wall 30, while the control housing 5 is sealed in relation to the booster housing 10 and, respectively, its housing part 47 on the brake pedal side by means of a fourth rolling diaphragm 55. The pneumatic control valve 6 is actuated by a valve piston 8 being in force-transmitting connection with the actuating member or the piston rod 3, the said valve piston carrying a first sealing seat 14 of the control valve 6, whose second sealing seat 15 is designed in the control housing 5. The two sealing seats 14, 15 cooperate with an elastic rotation-symmetrical valve member 16 which, for instance, is designed as a poppet valve known per se. The valve piston 8 with an end thereof is attached to a diaphragm wall 17 which isolates the valve chamber 48 from the first vacuum chamber 36 and thus, in the evacuated condition of the booster housing 10, is exposed to the effect of a pneumatic pressure difference which makes a force component become active which acts in opposition to the actuating direction of the control valve 6. The actuation of the control valve 6 is preferably effected by a lever mechanism 7 with variable transmission which is operable by means of an actuating rod 18 sealedly guided in the control housing 5, onto which actuating rod the actuating force introduced on the brake pedal 4 is transmitted via a force-transmitting element 19 which embraces the piston rod 3 like a fork and takes axial support thereon.

As can be taken further from FIG. 1, the lever mechanism 7 is composed of a first lever, that is reversing lever 11, and a second lever, that is transmission lever 12. The reversing lever 11 is supported to be rotatable within limits in a point of rotation 56 disposed on the transmission lever 12, and with its one end it is axially abutting on the end of the actuating rod 18, while its other end is suspended in an opening designed on the end of the valve piston 8 and not referred to in detail. The transmission lever 12 which is supported to be rotatable within limits in a point of rotation 31 on the control housing and which has a slightly curved contact surface 57 is abutted on an abutment surface formed on the partition wall 30 under bias by a spring 13 bearing against the control housing 5, preferably a leg spring, and it is furnished with a projection 58 in its area of support which is movable into engagement with a stop 32 designed on the control housing 5.

As has been mentioned already, the master brake cylinder 2 integrated in the booster housing 10 is designed as a tandem master cylinder whose pressure chambers 24, 26 lying one behind the other in the actuating direction are confined by a first (primary) piston 20 and a second (secondary) piston 25. Preferably, the primary piston 20 is of bipartite design and is composed of an external or annular piston 21 being in force-transmitting connection with the control housing 5 as well as of an internal piston 22 guided in the external piston 21 and being connected with the piston rod 3, on the one hand, while it is movable into engagement with an annular surface 23 formed in the external piston 21, on the other hand. The external or annular piston 21 takes support on the control housing 5 by means of a radial collar 59, transmission of the boosting power being permitted as a result. Furthermore, the external or annular piston 21 is provided with a force-transmitting sleeve 49 on its end remote from the primary pressure chamber 24, which sleeve serves as a stop for the internal piston 22, on the one hand, and permits that the control housing 5 is entrained in the event of vacuum failure, on the other hand.

Serving to bias the control housing 5 and, respectively, the movable walls 40, 42 in opposition to the actuating direction is a resetting spring 28 which is clamped in between the annular flange 27 designed on the master cylinder housing 35 and a supporting surface 60 provided on the control housing 5. The supply of outside air to the control valve 6 preferably takes place from the port 9 via an air duct 50 as well as a rubber or plastic hose 29 of suitable diameter connected thereto. It is expedient to have an air filter 51 inserted ahead of the air duct 50.

Figure 2:
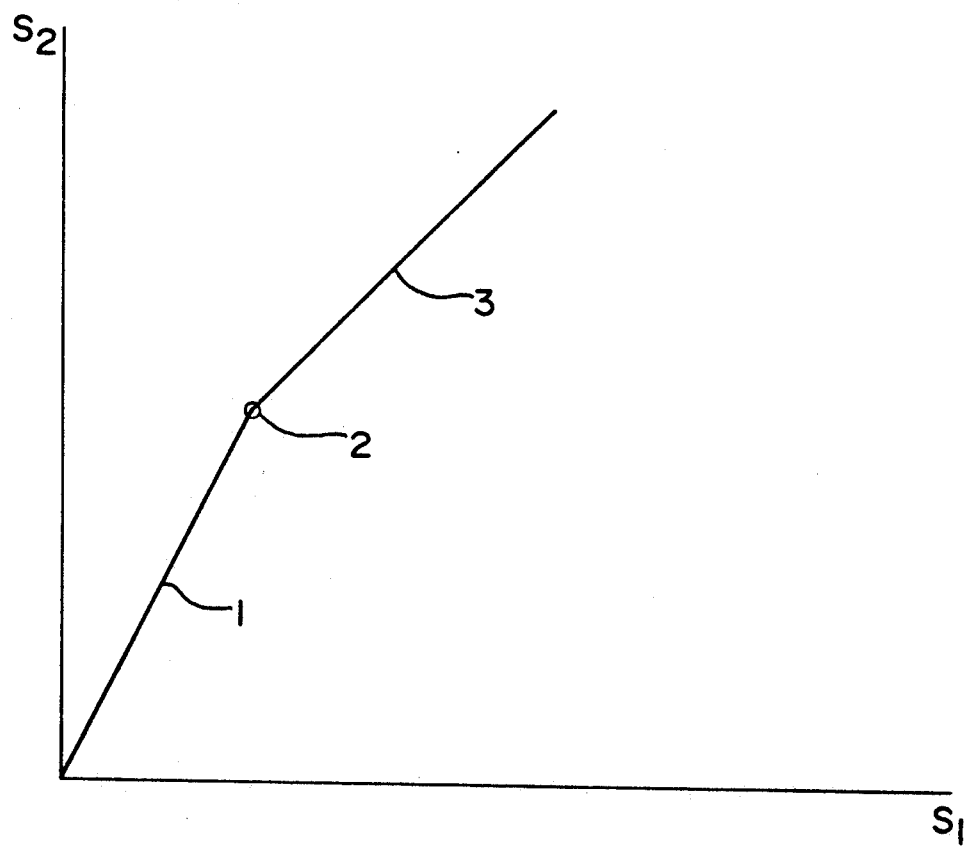
FIG. 2 is the dependency between the actuating stroke of the master cylinder and the actuating stroke of the actuating member in a diagram view.

The mode of function of the inventive actuating unit illustrated in the drawings will be described as follows:

It shall be assumed that the booster housing 10 is evacuated, that means that vacuum is prevailing both in the vacuum chambers 36, 37 and in the working chambers 38, 39 so that the movable walls 40, 42 are balanced in pressure. Once the brake pedal 4 is operated on braking, the actuating rod 18 will be displaced to the left in the drawing, and the reversing lever 11 will be tilted so that the first sealing seat 14 of the control valve 6 is lifted from the valve member 16 and the working chambers 38, 39 are ventilated. As a result, a pneumatic pressure differential is applied to the movable walls 40, 42 which generates a boosting force and wherefrom displacement of the control housing 5 is ensuing. Owing to the effect of the leg spring 13 the contact surface 57 of the transmission lever 12 is pressed against the stationary partition wall 30, while the transmission lever 12 is entrained via its point of rotation 31 by the control housing 5. Caused hereby the distance between the point of rotation 31 and the point of application of the transmission lever 12 on the partition wall 30 and hence the transmission ratio of the transmission lever 12 is varied during the actuation, and namely such that the ratio between control housing travel (primary piston stroke) and the actuating travel of the actuating rod 18 amounts to 2:1, for instance. With reference to FIG. 2, $S_1$ is the actuating travel of the actuating member and $S_2$ is the control housing travel. The first actuating period described before corresponds to the curve variation 1 in FIG. 2. This action lasts as long as until the transmission lever 12 with its projection 58 moves into abutment on the stop 32 on the control housing or, respectively, the transmission lever 12 lifts from the partition wall 30, whereby the transmission is deactivated (point 2 in FIG. 2). Since there is no more travel transmission ratio after the deactivation, the control housing travel or the primary piston stroke, respectively, corresponds to the actuating stroke of the actuating rod 18 (curve variation 3 in FIG. 2).

What is claimed is:

1. An actuating unit for hydraulic brake systems having a master brake cylinder and pneumatic brake power booster connected upstream thereof in terms of effect, a control valve actuatable by means of an actuating member, said brake booster comprising at least one movable wall which is operatively coupled to a control housing, and is adapted to be acted upon by a pneumatic differential pressure, said movable wall subdivides said power booster into at least one vacuum chamber and at least one working chamber ventilatable by actuation of the control valve, the control valve is operable opposite to the actuating direction of the actuating member by means of a lever mechanism that actively pulls said control valve with variable transmission which is ineffectual after a predefined actuating stroke of the master brake cylinder;

wherein the control housing is furnished with axial guide webs.

2. An actuating unit as claimed in claim 1, wherein the master brake cylinder is provided at an end with a radial annular flange which abuts axially on the booster housing remote from the actuating member and which serves to support a resetting spring which biasses the movable wall of the brake power booster in opposition to the actuating direction.

3. An actuating unit as claimed in claim 1, wherein the control valve is arranged in a valve chamber which can be vented and which is mounted to the control housing and is sealed in relation to said vacuum chamber by means of a diaphragm wall which is responsive to movement of a valve piston.

4. An actuating unit as claimed in claim 1, wherein the control valve is operable irrespective of the actuating member.

5. An actuating unit as claimed in claim 1, wherein the master brake cylinder includes a first piston including an external piston in force-transmitting connection with the control housing, and an internal piston in force-transmitting connection with the actuating member.

6. An actuating unit as claimed in claim 5, further including a force-transmitting sleeve provided on an end of the external piston which is movable into engagement with the control housing.

7. An actuating unit as claimed in claim 5, wherein the internal Piston is movable into engagement with an abutment surface in the external piston.

8. An actuating unit as claimed in claim 6, wherein the force-transmitting sleeve forms a stop for the internal piston.

9. An actuating unit as claimed in claim 1, further including a pneumatic port on the booster housing which permits evacuation of the booster housing as well as air supply to the control valve.

10. An actuating unit as claimed in claim 9, wherein the air supply from the pneumatic port to the control valve is effected by means of an air routing means.

11. An actuating unit as claimed in claim 9, wherein said pneumatic port further comprises an air duct and an air filter disposed in said air duct.

12. An actuating unit for hydraulic brake systems having a master brake cylinder and a pneumatic brake power booster connected upstream thereof in terms of effect, a control valve actuatable by means of an actuating member, said brake booster comprising at least one movable wall which is operatively coupled to a control housing, and is adapted to be acted upon by a pneumatic differential pressure, said movable wall subdivides said power booster into at least one vacuum chamber and at least one working chamber ventilatable by actuation of the control valve, the control valve is operable opposite to the actuating direction of the actuating member by means of a lever mechanism with variable transmission which is ineffectual after a predefined actuating stroke of the master brake cylinder, wherein the lever mechanism includes a first lever which is in force-transmitting connection with the actuating member and cooperates with a valve piston operably positioned within the control valve, and a second lever which is supported on the control housing and is rotatable within limits and cooperates with an abutment surface of said control housing said first lever is supported on said second lever to be rotatable within limits, and the distance between the point of rotation of the second lever and its point of application on the abutment surface is varied during actuation.

13. An actuating unit as claimed in claim 12, wherein the abutment surface of said control housing includes a biased spring.

14. An actuating unit as claimed in claim 13, wherein the spring is a leg spring.

15. An actuating unit as claimed in claim 12, wherein the second lever is confined by a stop formed upon the control housing.

16. An actuating unit as claimed in claim 13, wherein the brake power booster is configured as a vacuum brake power booster having pneumatic chambers which are isolated from each other by a partition wall on which the abutment surface is formed.

17. An actuating unit as claimed in claim 12, wherein the actuation of the control valve is performed by means of an actuating rod sealed and guided in the control housing and at one end axially abutting the first lever, and coupled at the opposite end to the actuating member.

18. An actuating unit as claimed in claim 17, wherein the coupling of the actuating rod to the actuating member is effected by means of a force-transmitting element which embraces the actuating member in a fork-like manner and is axially supported thereon.

19. An actuating unit as claimed in claim 1, wherein the master brake cylinder is designed as a tandem master cylinder which is integrated in a booster housing and on the housing of which the control housing with the movable wall of the brake power booster is guided.

20. An actuating unit as claimed in claim 16, wherein a first vacuum chamber is provided in the first pneumatic chamber remote from the actuating member and is isolated from a first working chamber by means of said movable wall.

21. An actuating unit as claimed in claim 20, wherein the first movable wall is sealed in relation to the booster housing by means of a first rolling diaphragm.

22. An actuating unit as claimed in claim 16, wherein the control housing is sealed in relation to the partition wall by means of a second rolling diaphragm.

23. An actuating unit as claimed in claim 20, wherein the first movable wall is provided with concentrically extending reinforcement ribs.

24. An actuating unit for hydraulic brake systems, said actuating unit comprising:
a pneumatic brake power booster and actuating means for actuating said power booster, said brake power booster having a control housing and a master cylinder, at least one movable wall interconnected to said control housing, said movable wall being responsive to pneumatic differential pressure and subdividing said booster housing into at least one vacuum chamber and at least one working chamber;
a control valve means for actuating said control valve, said control valve when actuated being adapted to vent said working chamber creating a pressure differential between said vacuum chamber and said working chamber, said control valve being actuated for a predefined period during the actuating stroke of said master brake cylinder, with said control housing traveling a distance greater than said actuating means during said predetermined period,
wherein said means for actuating said control valve includes a lever mechanism having a first lever operatively coupled to said actuating means and a second lever supported on the control housing rotatable within predefined limits, said first lever being supported on said second lever.

25. The actuating unit of claim 24, wherein said means for actuating said control valve includes a first lever interconnected between said control valve and said actuating means, and a second lever pivotally mounted upon said control housing, said second lever being pivotal between predetermined positions one of said positions being defined by an abutment, said first lever being pivotally mounted to said second lever such that said first lever pivots about a point of rotation spaced a distance from said abutment, said distance between said point of rotation and said abutment being varied during actuation of said actuation means.

26. An actuating unit as claimed in claim 25, wherein said means for actuating said control valve includes an actuating rod axially abutting said first lever on one end thereof and being coupled to said actuating means at the other end thereof.

27. An actuating unit as claimed in claim 24, wherein said control valve is operable in a direction opposite to the actuating direction of the actuating means.

28. The actuating unit of claim 24, wherein said control valve includes a valve member including a sealing means and a valve piston, said sealing means normally sealing said working chamber from atmospheric pressure, said valve piston being adapted to be displaced by actuation of said actuating means to displace said sealing means to ventilate said working chamber with atmospheric pressure creating a pneumatic pressure differential at said movable wall.

29. An actuating unit as claimed in claim 28, wherein said control valve is operable irrespective of said actuating member.

30. An actuating unit as claimed in claim 24, wherein said control housing is reciprocally received upon the outer housing of said master cylinder.

* * * * *